(12) United States Patent
Ito et al.

(10) Patent No.: US 9,865,400 B2
(45) Date of Patent: Jan. 9, 2018

(54) CAPACITOR

(71) Applicant: Murata Manufacturing Co., Ltd., Nagaokakyo-shi, Kyoto-fu (JP)

(72) Inventors: Ken Ito, Nagaokakyo (JP); Noriyuki Inoue, Nagaokakyo (JP); Koichi Kanryo, Nagaokakyo (JP)

(73) Assignee: MURATA MANUFACTURING CO., LTD., Nagaokakyo-Shi, Kyoto-Fu (JP)

( * ) Notice: Subject to any disclaimer, the term of this patent is extended or adjusted under 35 U.S.C. 154(b) by 25 days.

(21) Appl. No.: 15/204,069

(22) Filed: Jul. 7, 2016

(65) Prior Publication Data

US 2017/0018368 A1 Jan. 19, 2017

(30) Foreign Application Priority Data

Jul. 15, 2015 (JP) .................................. 2015-141084

(51) Int. Cl.
| | |
|---|---|
| *H01G 9/07* | (2006.01) |
| *H01G 9/042* | (2006.01) |
| *H01G 9/055* | (2006.01) |
| *H01G 9/045* | (2006.01) |

(52) U.S. Cl.
CPC ............. *H01G 9/07* (2013.01); *H01G 9/042* (2013.01); *H01G 9/055* (2013.01); *H01G 9/045* (2013.01)

(58) Field of Classification Search
CPC .......... H01G 9/07; H01G 9/042; H01G 9/055; H01G 9/045; H01G 4/30; H01G 4/33; H01G 4/10; H01G 4/12
See application file for complete search history.

(56) References Cited

U.S. PATENT DOCUMENTS

| | | | | |
|---|---|---|---|---|
| 6,947,275 | B1 * | 9/2005 | Anderson | .............. H01G 4/012 257/301 |
| 2008/0237794 | A1 * | 10/2008 | Shoji | ...................... H01G 4/012 257/532 |
| 2010/0271748 | A1 * | 10/2010 | Yoon | ........................ H01G 4/01 361/301.3 |
| 2014/0029158 | A1 * | 1/2014 | Inoue | ....................... H01G 4/30 361/301.4 |

OTHER PUBLICATIONS

Giuseppe Fiorentino et al.; "Impact of the atomic layer deposition precursors diffusion on solid-state carbon nanotube based supercapacitors performances"; Nanotechnology 26 (2015) 064002.

* cited by examiner

*Primary Examiner* — Dion R Ferguson
(74) *Attorney, Agent, or Firm* — Arent Fox LLP

(57) ABSTRACT

A capacitor that includes a conductive porous base material; a dielectric layer; and an electrode. The conductive porous base material, the dielectric layer, and the upper electrode are laminated together to constitute an effective part that accumulates charges in the dielectric layer when a voltage is applied between the conductive porous base material and the electrode. The conductive porous base material includes at least one groove having a width of 10 μm or more at ½ of a depth of the at least one groove.

20 Claims, 8 Drawing Sheets

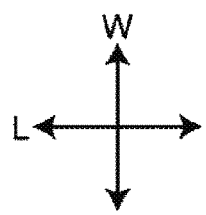
FIG. 6A
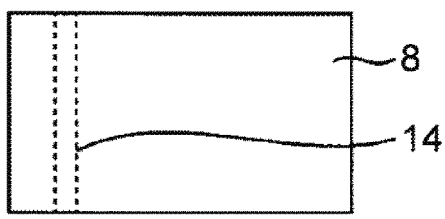
FIG. 6B
FIG. 6C
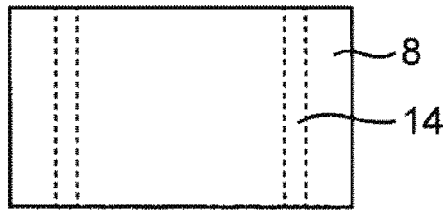
FIG. 6D
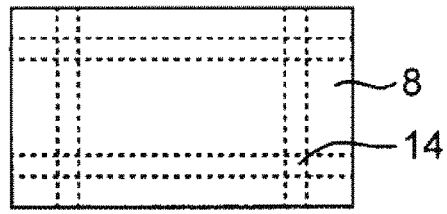
FIG. 6E
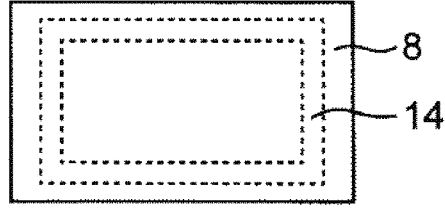
FIG. 6F
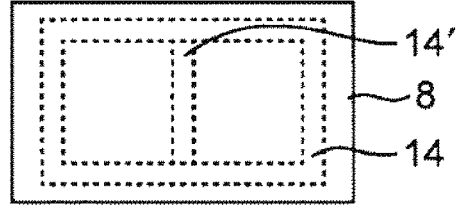

CAPACITOR

CROSS REFERENCE TO RELATED APPLICATIONS

The present application claims priority to Japanese Patent Application No. 2015-141084, filed Jul. 15, 2015, the entire contents of which are incorporated herein by reference.

BACKGROUND OF THE INVENTION

Field of the Invention

The present invention relates to a capacitor.

Description of the Related Art

In recent years, with higher-density mounting of electronic devices, capacitors with higher electrostatic capacitance have been required. As such a capacitor, for example, Nanotechnology 26 (2015) 064002 discloses therein a capacitor that has an $Al_2O_3$ layer as a dielectric layer and a TiN layer as an upper electrode formed on a porous body composed of a carbon nanotube with the use of an atomic layer deposition method (ALD method: Atomic Layer Deposition).

SUMMARY OF THE INVENTION

For the capacitor as mentioned above, the dielectric layer and the upper electrode are formed in layers on the porous body. In the manufacturing process, or when bending stress is produced on the substrate, the layers are likely to cause brittle fractures. As long as the dielectric layer has a self-repairing function like electrolytic capacitors, there is no short circuit caused between the electrodes even when the dielectric layer is cracked. However, the capacitor with the dielectric layer and upper electrode laminated on the porous body has no self-repairing function, and thus has the problem of causing a short circuit between the electrodes even with a small crack.

Therefore, an object of the present invention is to provide a capacitor which has crack generation suppressed, or suppresses the development of cracks into an effective part for acquiring electrostatic capacitance, even when the cracks are generated.

The inventors have, as a result of earnestly studying in order to solve the problem mentioned above, found that the generation and development of cracks can be suppressed by forming a groove in a capacitor with a dielectric layer and an upper electrode laminated on a porous body, thereby achieving the present invention.

According to an aspect of the present invention, a capacitor is provided which includes a conductive porous base material including a porous part; a dielectric layer; and an upper electrode, where the porous part of the conductive porous base material, the dielectric layer, and the upper electrode are laminated to constitute an effective part that accumulates a charge in the dielectric layer when a voltage is applied between the conductive porous base material and the upper electrode, and the capacitor further includes a groove, and the groove width is 10 μm or more at ½ of the groove depth.

According to the present invention, the generation of cracks can be suppressed by forming a groove at the surface of the capacitor, and furthermore, even when cracks are generated, the development of the cracks into the effective part for acquiring electrostatic capacitance can be suppressed.

BRIEF DESCRIPTION OF THE DRAWINGS

FIGS. 6A to 6F are diagrams for explaining the planar shapes of grooves;

DETAILED DESCRIPTION OF THE INVENTION

Capacitors according to the present invention will be described in detail below with reference to the drawings. However, the capacitor according to the present embodiment and the shapes and arrangement of respective constructional elements are not limited to the examples shown in the figures.

Figure 1:
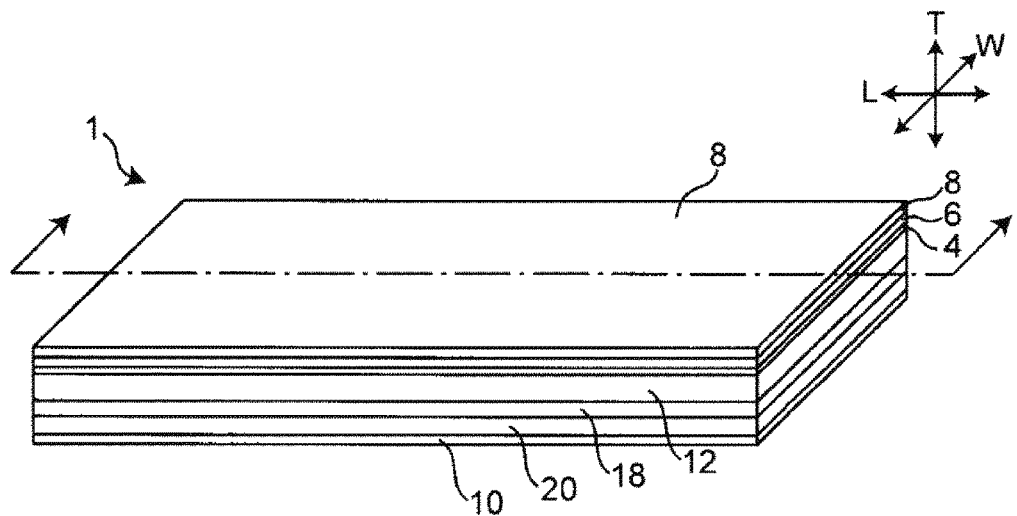
FIG. 1 is a schematic perspective view of a capacitor 1 according to an embodiment of the present invention.
Figure 2:
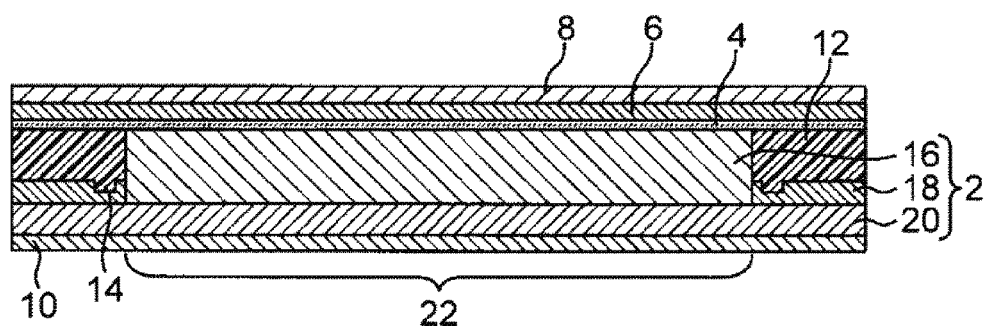
FIG. 2 is a schematic cross-sectional view of the capacitor 1 shown in FIG. 1.
Figure 3:
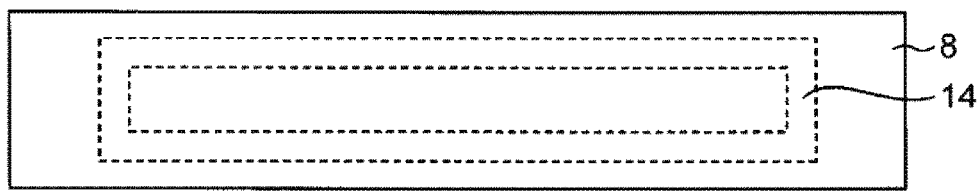
FIG. 3 is a schematic plan view of a conductive metallic substrate of the capacitor 1 shown in FIG. 1.
Figure 4:
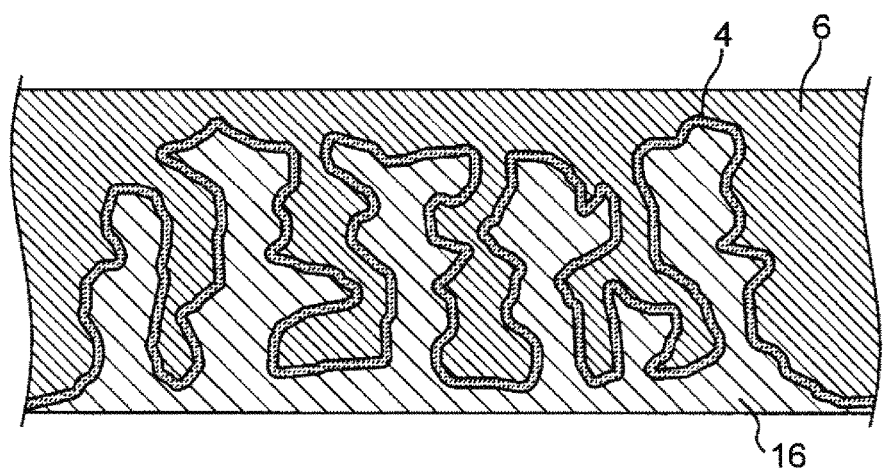
FIG. 4 is a schematic cross-sectional view of a high-porosity part of the capacitor 1 shown in FIG. 1.
Figure 5:
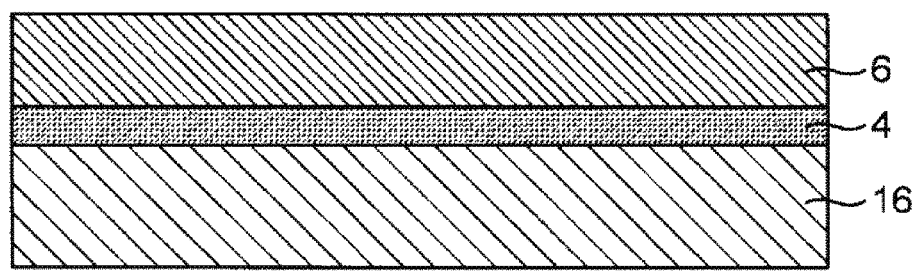
FIG. 5 is a diagram schematically illustrating a layered structure in the high-porosity part of the capacitor 1 shown in FIG. 1.

FIG. 1 shows therein a schematic perspective view of a capacitor 1 according to the present embodiment, FIG. 2 shows a schematic cross-sectional view thereof, and FIG. 3 shows a schematic plane view thereof (however, pores in a porous part are not shown for the sake of simplification). In addition, FIG. 4 schematically shows an enlarged view of a high-porosity part 16 of a conductive porous base material 2, and FIG. 5 schematically shows a layered structure of the high-porosity part 16, a dielectric layer 4, and an upper electrode 6.

As shown in FIGS. 1, 2, 3, 4, and 5, the capacitor 1 according to the present embodiment has a substantially cuboid shape, and schematically has the conductive porous base material 2, the dielectric layer 4, the upper electrode 6, a first external electrode 8, a second external electrode 10, an insulating part 12, and a groove 14. The conductive porous base material 2 has, at one principal surface side, a high-porosity part 16 that is relatively higher in porosity, and a low-porosity part 18 that is relatively lower in porosity. In addition, the low-porosity part 18 is formed around the high-porosity part 16. The low-porosity part 18 has the groove 14 formed to surround the high-porosity part 16. The high-porosity part 16 has a porous structure, that is, corresponding to the porous part according to the present invention. In addition, the conductive porous base material 2 has a supporting part 20 at the other principal surface side. The high-porosity part 16, the dielectric layer 4, and the upper electrode 6 are laminated to constitute an effective part 22 that accumulates charges in the dielectric layer 4 when a voltage is applied between the conductive porous base material 2 and the upper electrode 6. The inside of the groove 14 and the space on the low-porosity part 18 are filled with a resin which constitutes the insulating part 12. The capacitor 1 has the first external electrode 8 on the upper electrode 6, and the second external electrode 10 on the surface of the conductive porous base material 2 closer to the supporting part 20.

The conductive porous base material 2 has a porous structure, and the material and composition thereof are not limited as long as the surface is conductive. Examples of the conductive porous base material include, for example, a porous metallic base material, or a base material with a conductive layer formed on the surface of a porous silica material, a porous carbon material, or a porous ceramic sintered body. In a preferred embodiment, the conductive porous base material is a porous metallic base material.

Examples of the metal constituting the porous metallic base material include, for example, metals such as aluminum, tantalum, nickel, copper, titanium, niobium, and iron, and alloys such as stainless steel and duralumin. Preferably, the porous metallic base material is an aluminum porous base material.

The conductive porous base material 2 has the high-porosity part (porous part) 16 and the low-porosity part 18 at one principal surface side, and the supporting part 20 at other principal surface side.

The porosity in the high-porosity part can be preferably 20% or more, more preferably 30% or more, further preferably 50% or more, and yet further preferably 60% or more. Increasing the porosity can further increase the capacitance of the capacitor. In addition, from the perspective of increasing the mechanical strength, the porosity of the high-porosity part can be preferably 90% or less, and more preferably 80% or less.

The term "porosity" in this specification refers to the proportion of voids in the porous part. The porosity can be measured in the following way.

A sample of the porous part for TEM (Transmission Electron Microscope) observation is prepared by a FIB (Focused Ion Beam) micro-sampling method. A cross section of the sample is observed at a magnification of around 50,000, and subjected to measurement by STEM (Scanning Transmission Electron Microscopy)-EDS (Energy Dispersive X-ray Spectrometry) mapping analysis. The proportion of the area without the base material is regarded as the porosity in the visual field of the mapping analysis.

The high-porosity part is not particularly limited, but preferably has an expanded surface ratio of 30 times or more and 10,000 times or less, more preferably 50 times or more and 5,000 times or less, for example, 300 times or more and 600 times or less. In this regard, the expanded surface ratio refers to the ratio of the surface area per unit projected area. The surface area per unit projected area can be obtained from the amount of nitrogen adsorption at a liquid nitrogen temperature with the use of a BET specific surface area measurement system.

The thickness of the high-porosity part is not particularly limited, but can be appropriately selected for any purpose, and may be, for example, 10 μm or more and 1000 μm or less, preferably 30 μm or more and 300 μm or less.

The low-porosity part is a region that is lower in porosity than the high-porosity part. It is to be noted that there is no need for the low-porosity part to have pores. The porosity of the low-porosity part is preferably 60% or less of the porosity of the high-porosity part, and more preferably 50% or less of the porosity of the high-porosity part, from the perspective of increasing the mechanical strength. For example, the porosity of the low-porosity part is preferably 20% or less, and more preferably 10% or less. In addition, the low-porosity part may have a porosity of 0%. The low-porosity part contributes to improved mechanical strength of the capacitor.

Examples of the method for forming the low-porosity part include, for example, a method of melting the metal by laser irradiation or the like, thereby filling pores, or a method of compressing by mold processing or press working, thereby filling pores. Types of the laser include a fiber laser, a $CO_2$ laser, a YAG laser, a YVO laser, and an excimer laser, and due to the fact that more precise control is possible, it is preferable to use a femtosecond laser, a picosecond laser, or a nanosecond laser for short-pulse irradiation.

The porosity of the supporting part of the conductive porous base material is preferably low for fulfilling the function as the supporting body, specifically, preferably 10% or less, and more preferably, there is substantially no void in the supporting body.

The thickness of the supporting part 10 is not particularly limited, but is preferably 10 μm or more, and can be, for example, 100 μm or more or 500 μm or more in order to increase the mechanical strength of the capacitor. In addition, from the perspective of achieving a lower-profile capacitor, the thickness is preferably 1000 μm or less, and can be, for example, 500 μm or less or 100 μm or less.

It is to be noted that the conductive porous material has the high-porosity part and the low-porosity part present around the high-porosity part at one principal surface in the present embodiment, but the present invention is not limited thereto. More specifically, the high-porosity part and the low-porosity part are not particularly limited in terms of presence location, the number of parts located, size, shape, the ratio between both the high-porosity part and the low-porosity part, and the like. In addition, there is no need for the high-porosity part and the low-porosity part to be uniform in thickness. For example, the low-porosity part is not an essential element, but one principal surface of the conductive porous base material may be composed of only the high-porosity part. Furthermore, the two principal surfaces of the conductive porous base material may have the high-porosity part.

The groove 14 is formed at the surface where the porous part 16 of the conductive porous base material 2 is present. The number of grooves is not particularly limited, but there may be one or more grooves.

The shape of the groove is not particularly limited. For example, the groove may be formed in any shape of a line, a curve, and a combination thereof, when the surface of the conductive porous base material with the groove is viewed from above (as viewed as in FIG. 3 in the case of the capacitor 1). Embodiments in FIGS. 6A to 6F are provided as specific examples.

In FIG. 6A, a groove 14 is formed in a linear fashion. It is to be noted that the groove 14 is formed from one side surface to the opposed side surface in FIG. 6A, but not limited thereto, and can be formed, for example, to have a length of 50%, 75%, 90%, or 95% of the length between side surfaces (the length in the W direction in this case). In addition, in this case, the groove may be formed away from one side surface, or formed away from both side surfaces. In addition, the groove is formed in the W direction in FIG. 6A, but not limited thereto, and may be formed in other direction, for example, the L direction. Furthermore, the groove is formed in a continuous linear fashion in FIG. 6A, but not limited thereto, and may be partially discontinuous, for example, formed in an intermittent fashion as shown in FIG. 6B. Preferably, the groove is formed in a continuous linear fashion.

In FIG. 6C, two grooves 14 are formed in a linear fashion. Also in this case, the locations and lengths of the grooves are not limited to the example shown, but can be formed in various patterns as is the case with the foregoing.

In addition, the two grooves may differ in length.

In FIG. 6D, grooves 14 are formed to intersect. Also in this case, the shapes of the grooves are not limited to the example shown, but can be formed in various shapes.

In FIG. 6E, a groove 14 can have a closed shape. Also in this case, the shape of the groove is not limited to the example shown. For example, the groove forms a rectangular in FIG. 6E, but not limited thereto, and may form a circular shape, an elliptical shape, a trapezoidal shape, or other polygonal shape, and may have various sizes. In addition, as shown in FIG. 6F, a groove 14' may be further present in a region closed by a groove 14.

Preferably, the groove 14 is formed to separate the effective part 22 of the capacitor from ends thereof.

For example, when the effective part is located in a central part of the principal surface of the conductive porous base material as in the case of the capacitor 1, the groove separates the left end in the figure from the effective part in FIG. 6A. In FIG. 6C, the grooves separate the right and left ends in the figure from the effective part. In FIGS. 6D and 6E, the grooves separate all of the four ends from the effective part. In FIG. 6F, the outer groove 14 (the groove corresponding to FIG. 6E) separates all of the four ends from the effective part, and the central groove 14' is located across the effective part. It is to be noted that the end means a certain region from the side surface, and can be, for example, a region from the side surface to a distance of 30%, 20%, or 10% toward the opposed side surface, or a region from the side surface to 1 mm, 500 µm, 100 µm, 50 µm, or 20 µm.

Figure 7A:
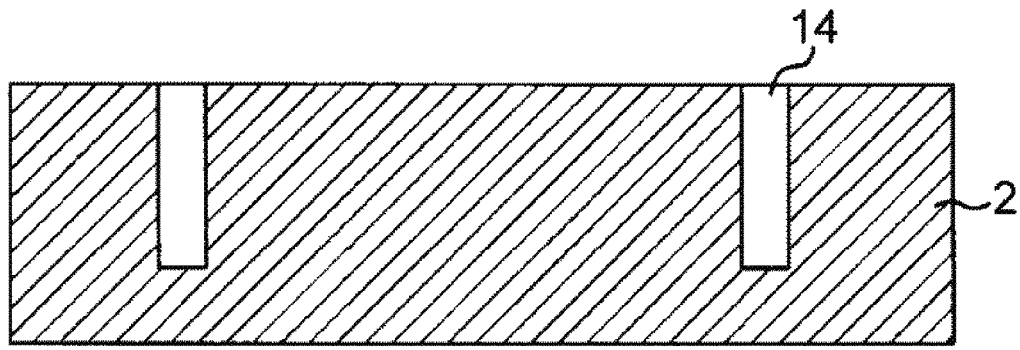
FIGS. 7A to 7C are diagrams for explaining the cross-sectional shapes of grooves.
Figure 7B:
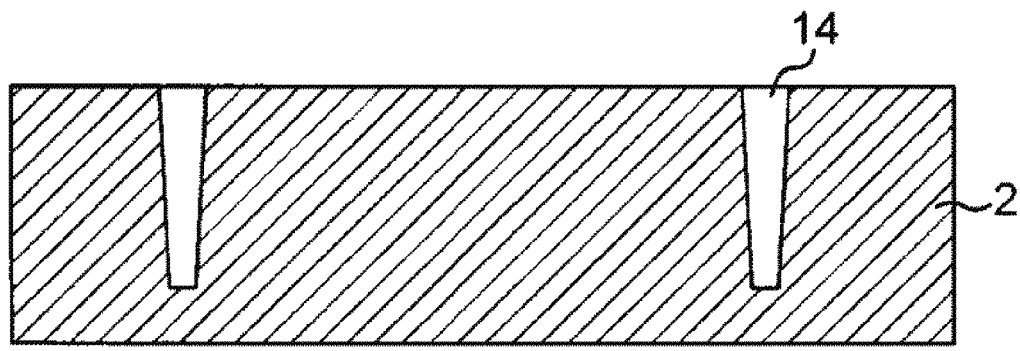
Figure 7C:
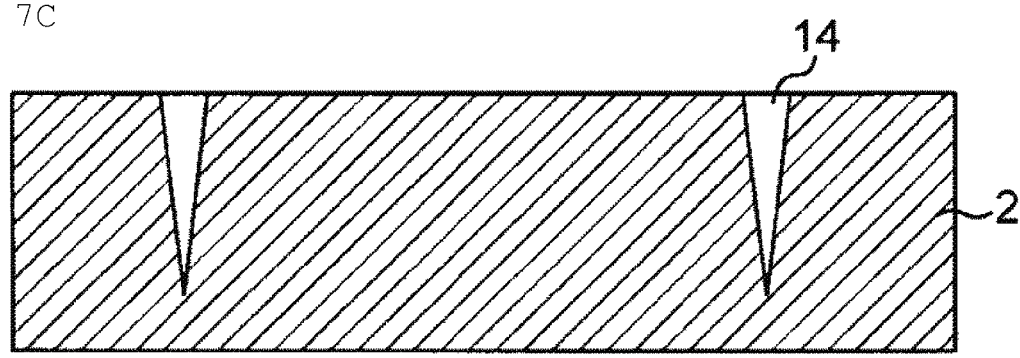

The cross-sectional shape (the shape of a cross section in the W-T direction of the capacitor) of the groove is not particularly limited, but may be various shapes such as a rectangle (FIG. 7A), a trapezoid (FIG. 7B), and a triangle (FIG. 7C), for example.

The depth of the groove is not particularly limited as long as the depth is adapted not to penetrate through the conductive porous base material. For example, the upper limit of the groove depth can be a depth corresponding to 95%, 90%, 80%, 70%, 60%, or 50% of the thickness of the conductive porous base material. In addition, the lower limit of the groove depth can be a depth corresponding to 5%, 10%, 20%, 30%, 40%, or 50% of the thickness of the conductive porous base material. Preferably, the depth can be equal to or more than the thickness of the effective part. The groove depth made equal to or more than the thickness of the effective part, and thereby can further ensure that the ends are separated from the effective part, and that cracks generated at the ends are prevented from developing into the effective part.

Figure 8:
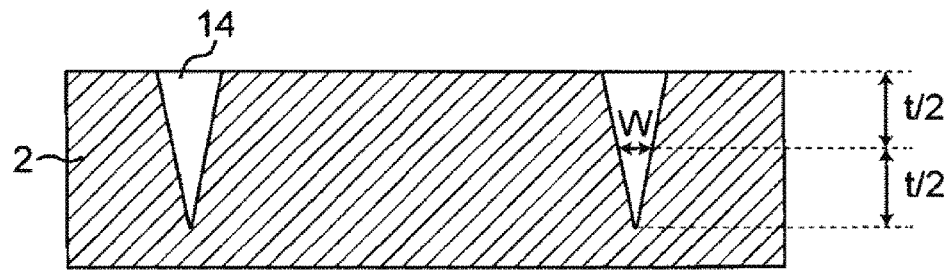
FIG. 8 is a diagram for explaining the width of a groove.

The width w of the groove is not particularly limited, but can be preferably 10 µm or more, more preferably 30 µm or more, and for example, 50 µm or more or 100 µm or more, at a ½ location of the groove depth t (see FIG. 8).

The method for forming the groove is not particularly limited, but examples thereof include dicer processing and laser abrasion processing.

In the capacitor 1, the groove 14 is filled with a resin, thereby forming the insulating part 12. Polyimide based resins, fluorine-based resins, epoxy-based resins, BT resins, and the line are preferred as the resin. The resin may include a filler.

It is to be noted that while the groove is filled with the resin in the capacitor 1, the present invention is not limited thereto, but the groove may be filled with other material, for example, a metal material, a glass material, a ceramic material, or the like. As the filling material, a substance that is higher in fracture toughness than the upper electrode is preferred, e.g., Cu, Ni, liquid glass, bismuth-based glass, crystallized glass. The use of such a material can further suppress the generation of cracks and the development of cracks. In addition, although it is preferable to fill the groove, there is not always a need to fill the groove, but the groove may be hollow.

Examples of the filling method with the filling material include an air-type dispenser, a jet dispenser, screen printing, and a static coating method.

In an embodiment, the filling may be carried out so as to completely fill the groove, but preferably carried out partway. Carrying the filling partway can, even when the filling amount varies, prevent the substance from spilling from the groove, thereby suppressing the variation in the size of the capacitor in the height direction.

In the capacitor 1 according to the present embodiment, the dielectric layer 4 is formed on the high-porosity part 16 (and the insulating part 12).

The material that forms the dielectric layer 4 is not particularly limited as long as the material has an insulating property, but preferably, examples thereof include metal oxides such as $AlO_x$ (for example, $Al_2O_3$), $SiO_x$ (for example, $SiO_2$), $AlTiO_x$, $SiTiO_x$, $HfO_x$, $TaO_x$, $ZrO_x$, $HfSiO_x$, $ZrSiO_x$, $TiZrO_x$, $TiZrWO_x$, $TiO_x$, $SrTiO_x$, $PbTiO_x$, $BaTiO_x$, $BaSrTiO_x$, $BaCaTiO_x$, and $SiAlO_x$; metal nitrides such as $AlN_x$, $SiN_x$, and $AlScN_x$; and metal oxynitrides such as $AlO_xN_y$, $SiO_xN_y$, $HfSiO_xN_y$, and $SiC_xO_yN_z$, and $AlO_x$, $SiO_x$, $SiO_xN_y$, and $HfSiO_x$ are preferred. It is to be noted that the formulas mentioned above are merely intended to represent the constitutions of the materials, but not intended to limit the compositions. More specifically, the x, y, and z attached to O and N may have any value larger than 0, and the respective elements including the metal elements may have any presence proportion.

The thickness of the dielectric layer is not particularly limited, but for example, preferably 5 nm or more and 100 nm or less, and more preferably 10 nm or more and 50 nm or less. The adjustment of the thickness of the dielectric layer to 5 nm or more can enhance the insulating property, thereby making it possible to reduce the leakage current. In addition, the adjustment of the thickness of the dielectric layer to 100 nm or less makes it possible to achieve higher electrostatic capacitance.

The dielectric layer is preferably formed by a gas phase method, for example, a vacuum deposition method, a chemical vapor deposition (CVD: Chemical Vapor Deposition) method, a sputtering method, an atomic layer deposition (ALD: Atomic Layer Deposition) method, a pulsed laser deposition method (PLD: Pulsed Laser Deposition), or the like. The ALD method is more preferred because a more homogeneous and denser film can be formed even in fine pores of the porous member.

In the capacitor 1 according to the present embodiment, the upper electrode 6 is formed on the dielectric layer 4.

The material constituting the upper electrode 6 is not particularly limited as long as the material is conductive, but examples thereof include, Ni, Cu, Al, W, Ti, Ag, Au, Pt, Zn, Sn, Pb, Fe, Cr, Mo, Ru, Pd, and Ta and alloys thereof, e.g., CuNi, AuNi, AuSn, and metal nitrides and metal oxynitrides such as TiN, TiAlN, TiON, TiAlON, TaN, conductive polymers (for example, PEDOT (poly(3,4-ethylenedioxythiophene)), polypyrrole, polyaniline), and TiN and TiON are preferred.

The thickness of the upper electrode is not particularly limited, but for example, preferably 3 nm or more, and more preferably 10 nm or more. The adjustment of the thickness of the upper electrode to 3 nm or more can reduce the resistance of the upper electrode itself.

The upper electrode may be formed by an ALD method. The use of the ALD method can increase the capacitance of the capacitor. The upper electrode may be formed by, as an alternative method, a method such as a chemical vapor deposition (CVD: Chemical Vapor Deposition) method, plating, a bias sputtering, a Sol-Gel method, and conductive polymer filling which can coat the dielectric layer and substantially fill pores of the porous metallic base material. Preferably, the upper electrode may be formed in a way that a conductive film is formed by an ALD method on the dielectric layer, and thereon, pores are filled by another approach with a conductive substance, preferably a substance that is lower in electrical resistance. This configuration can achieve a higher capacitance density and a lower equivalent series resistance (ESR: Equivalent Series Resistance) in an effective manner.

It is to be noted that when the upper electrode has insufficient conductivity as a capacitor electrode after the formation of the upper electrode, an extension electrode layer composed of Al, Cu, Ni, or the like may be additionally formed on the surface of the upper electrode by a method such as sputtering, vapor deposition, or plating.

According to the present embodiment, the first external electrode 8 is formed on the upper electrode 6.

According to the present embodiment, the second external electrode 10 is formed on the principal surface of the conductive porous base material 2 closer to the supporting part 20.

The materials constituting the first and second external electrodes 8, 10 are not particularly limited, but examples thereof include, for example, metals such as Au, Pb, Ag, Sn, Ni, Cu, and Pd, and alloys. The method for forming the external electrodes is not particularly limited, but for example, a CVD method, electrolytic plating, electroless plating, vapor deposition, sputtering, baking of a conductive paste, and the like can be used, and electrolytic plating, electroless plating, vapor deposition, sputtering, and the like are preferred.

It is to be noted that the first external electrode 8 and the second external electrode 10 are disposed on the entire upper and lower surfaces of the capacitor, but not limited thereto, and can be disposed in any shape and size only on a part of each surface. In addition, the first external electrode 8 and the second external electrode 10 are not essential elements, or do not have to be present. In this case, the upper electrode 6 also functions as the first external electrode, whereas the supporting part 20 also functions as the second external electrode. More specifically, the upper electrode 6 and the supporting part 20 may function as a pair of electrodes. In this case, the upper electrode 6 may function as an anode, whereas the supporting part 20 may function as a cathode. Alternatively, the upper electrode 6 may function as a cathode, whereas the supporting part 20 may function as an anode.

While the capacitor 1 according to the present embodiment has been described above, various modifications can be made to the capacitor according to the present invention.

For example, although the capacitor has a substantially cuboid shape in the embodiment described above, the present invention is not limited to the shape. The capacitor according to the present invention can be made into any shape, and for example, the planar shape may be circular, elliptical, quadrangular with rounded corners, or the like. In addition, there is also no need for the capacitor to be uniform in thickness, but a part, for example, an end may be smaller in thickness.

In another embodiment, a layer for enhancing interlayer adhesion, a buffer layer for preventing the diffusion of constituents between the respective layers, or the like may be disposed between the respective layers. In addition, the side surface or the like of the capacitor may be provided with a protective layer.

Although the capacitor 1 according to the present embodiment has the upper electrode and the external electrode to reach edges of the capacitor, the present invention is not limited thereto. In an embodiment, the upper electrode (preferably the upper electrode and the first external electrode) is disposed away from edges of the capacitor. This disposition can prevent end surface discharge. More specifically, the upper electrode may not be formed to cover the entire upper surface of the capacitor, or the upper electrode may be formed to cover only the high-porosity part.

EXAMPLES

Example 1—Manufacture of Capacitor Element

Figure 9:
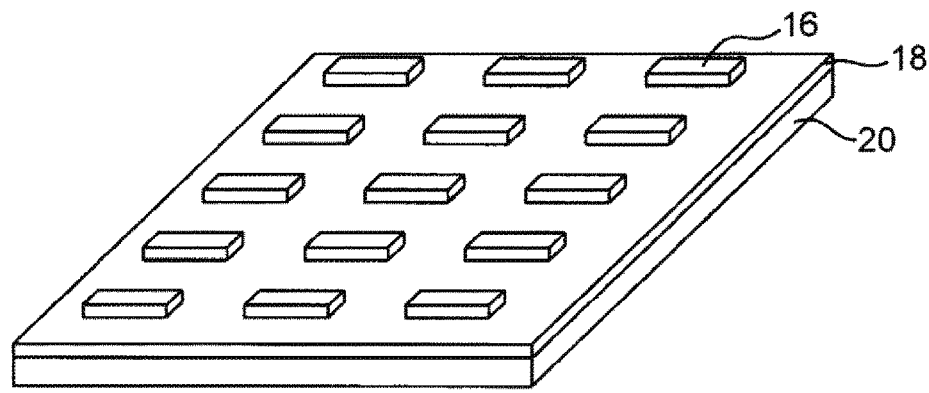
FIG. 9 is a diagram illustrating low-porosity parts formed in a conductive porous base material according to Example 1.
Figure 10:
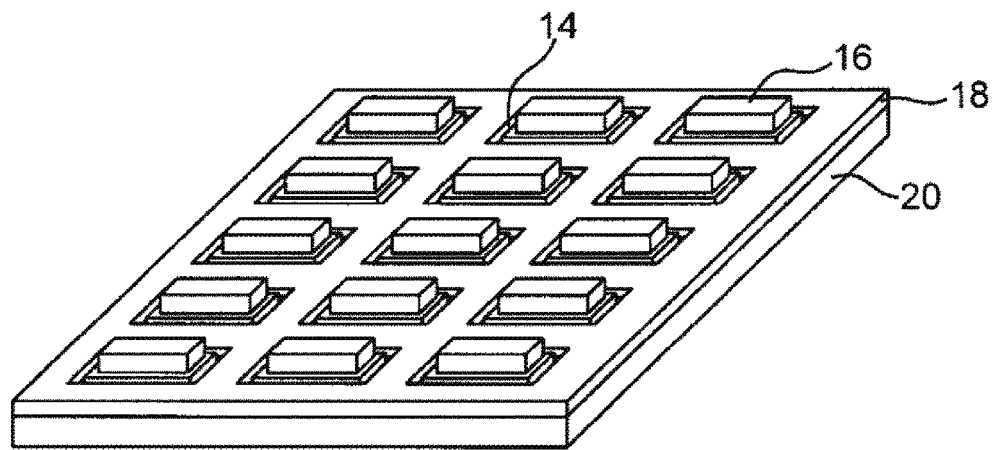
FIG. 10 is a diagram illustrating grooves formed in the conductive porous base material according to Example 1.

Aluminum etched foil for aluminum electrolytic capacitor with a thickness of 70 µm, a porous part (thickness: 35 µm, porous average size: 0.5 µm) formed only at one side, and an expanded surface ratio of approximately 200 times was used as the conductive porous base material. Next, after forming low-porosity parts in a grid-like manner by mold press (FIG. 9), and thereafter, grooves were formed by removing the low-porosity parts so as to surround high-porosity parts (effective parts) with the use of a fiber laser or a nanosecond laser system (FIG. 10). In Example 1, there is no groove in contact with the high-porosity part as shown in FIG. 10. In this regard, a collective board (12 types in total) was prepared by varying the groove depth (the distance from the upper surface of the high-porosity part) under three conditions (respectively for 10 µm, 20 µm, and 30 µm), and further varying the groove width under four conditions (respectively for 5 µm, 10 µm, 100 µm, and 500 µm).

Thereafter, the space on the low-porosity parts and the inside of the grooves were filled with a polyimide resin by coating with an air-type dispenser system. Next, $AlO_x$ of 30 nm was deposited by an ALD method, thereby forming a dielectric layer. Then, TiN was deposited by ALD to fill pores, thereby forming an upper electrode. Next, the lower surface of the element was subjected to a zincate treatment as a pretreatment, and to an electroless Ni plating treatment. On each of the upper and lower surfaces of the element, a terminal electrode was formed by electroless Cu plating.

Figure 11:
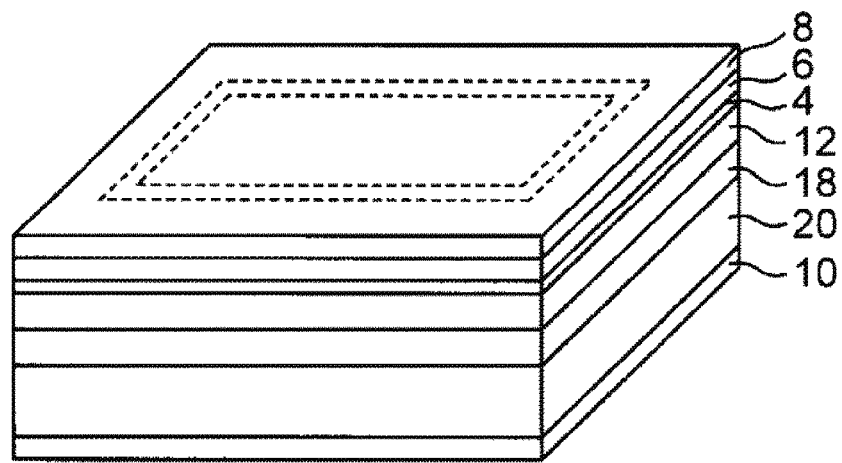
FIG. 11 is a schematic perspective view of a capacitor obtained according to Example 1.
Figure 12:
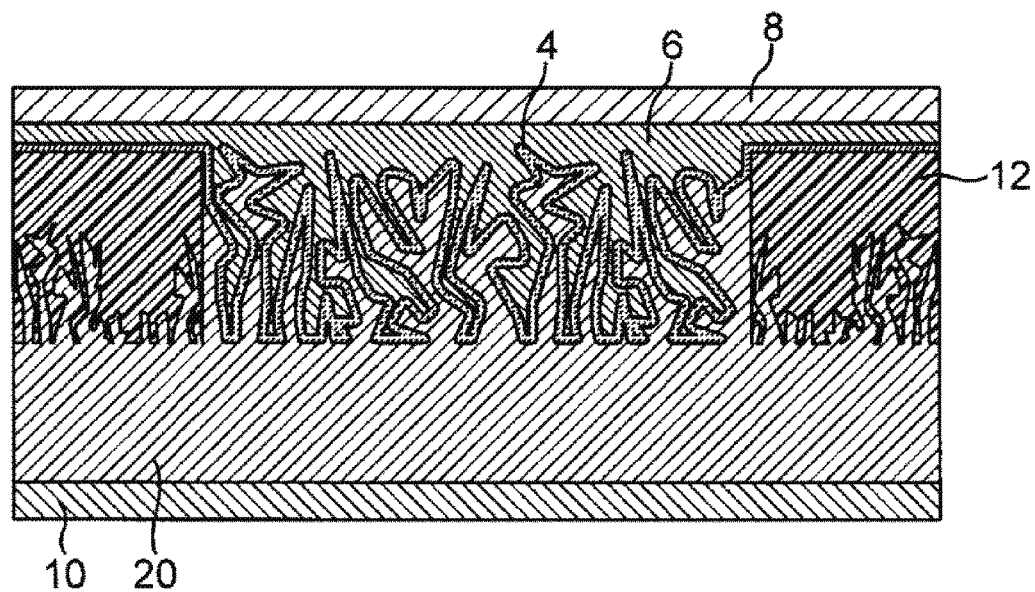
FIG. 12 is a schematic cross-sectional view of the capacitor obtained according to Example 1.

Central parts of the low-porosity parts of the obtained collective board were subjected to full cutting with the use of a fiber laser or a nanosecond laser system, thereby individualizing pieces into respective elements, and thus providing capacitors according to Example 1 (FIGS. 11 and 12).

Porosity

For two capacitors randomly drawn from the capacitors obtained as mentioned above according to Example 1, the porosity of the conductive porous base material was measured in the following way.

First, with the use of a FIB (Focused Ion Beam) system (SMI 3050SE from Seiko Instruments Inc.), a substantially central part of the high-porosity part of the conductive porous base material was processed into a thin section to be approximately 50 nm in thickness, thereby preparing a measurement sample. Further, the FIB damage layer produced in processing into the thin section was removed with the use of an Ar ion milling system (PIPSmodel691 from GATAN Inc.).

Then, a region of 3 μm×3 μm was subjected to EDS (Energy dispersive X-ray spectrometry) mapping analysis at any three points of the sample with the use of a scanning transmission electron microscope (JEM-2200FS from JEOL Ltd.). Then, the area a1 of the region with the base material (Al) present was obtained from the mapping analysis result, and from the area a1 and the measurement area a2 (=3 μm×3 μm), an individual porosity x was calculated on the basis of the following formula (1).

$$x=\{(a2-a1)/a2\}\times 100 \quad (1)$$

Furthermore, the average for the individual porosity x was obtained among the three points, and the average between the two samples was further obtained, and regarded as the porosity of the high-porosity part. The result was approximately 60%.

Withstand Voltage Test

The current value obtained when a voltage of 10 V was applied was measured with the use of the elements obtained by individualizing pieces. The element with the current value in excess of 1 mA was regarded as a defective, and the non-defective product percentage was calculated. The result is shown in Table 1 below.

TABLE 1

| Groove width | Groove depth | | | |
|---|---|---|---|---|
| | 5 μm | 10 μm | 100 μm | 500 μm |
| 20 μm | 10% | 80% | 90% | 90% |
| 30 μm | 10% | 70% | 80% | 80% |

Example 2—Manufacture of Capacitor Element

Figure 13:
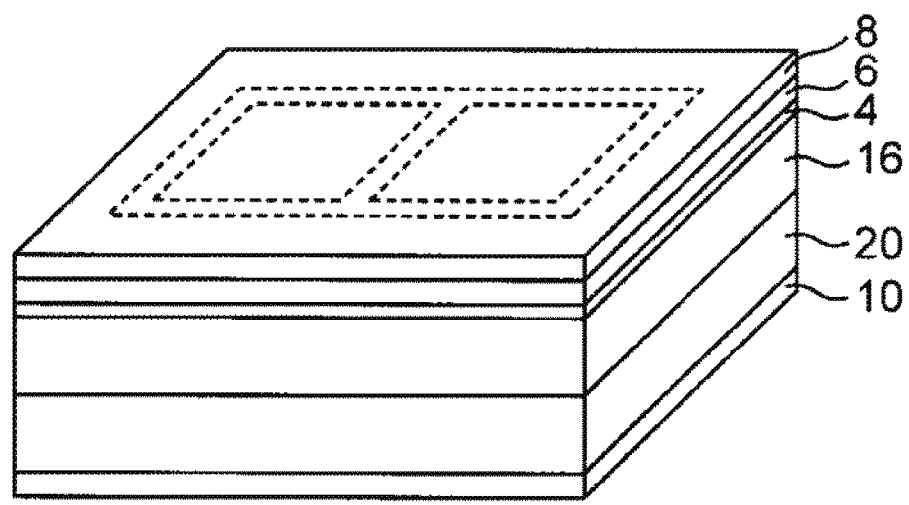
FIG. 13 is a schematic perspective view of a capacitor obtained according to Example 2.
Figure 14:
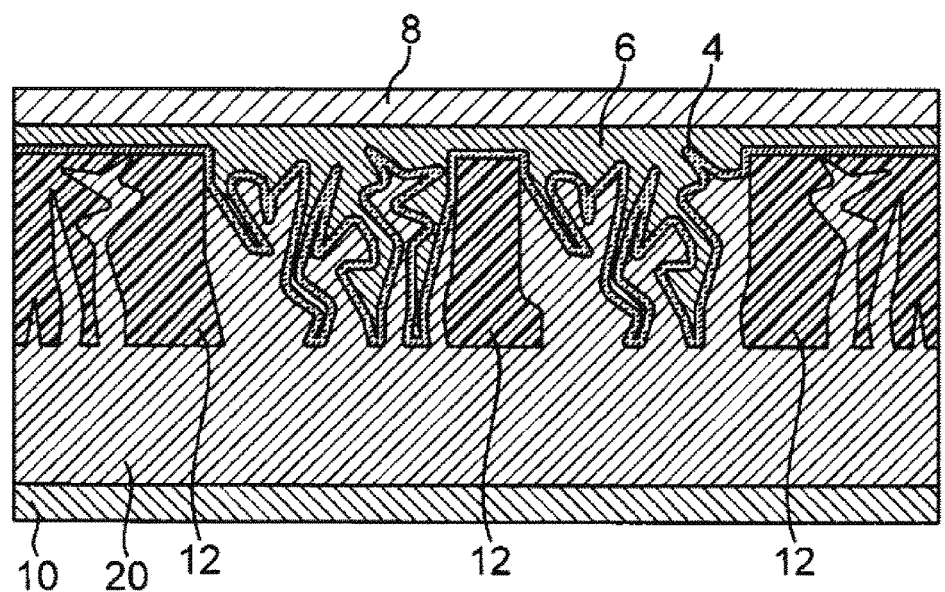
FIG. 14 is a schematic cross-sectional view of the capacitor obtained according to Example 2.

A capacitor according to Example 2 was obtained in the same way as in Example 1, except that a groove was formed without forming any low-porosity part, and a groove was formed in the center of the effective part (FIGS. 13 and 14). In this regard, the processing was carried out for a groove depth of 20 μm and a groove width of 20 μm.

Withstand Voltage Test

As a result of carrying out a withstand voltage test as in Example 1, the non-defective product percentage was further improved as compared with Example 1. The non-defective product percentage was 95%.

Example 3

Figure 15A:
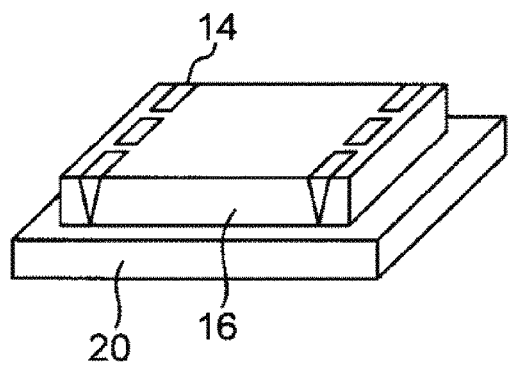
FIGS. 15A and 15B are respectively schematic perspective views for illustrating the shapes of grooves in capacitors obtained according to Example 3.
Figure 15B:
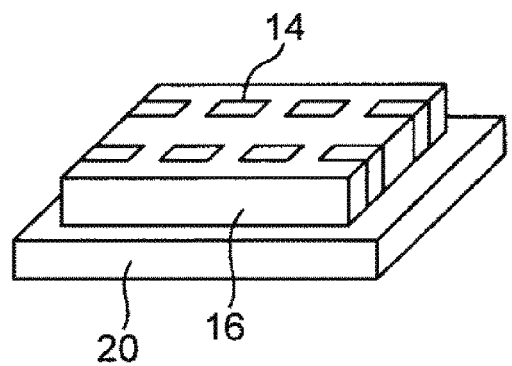

In the same way as in Example 1 except that two grooves were formed along two opposed side surfaces of an effective part, capacitors were obtained respectively to have a pair of grooves horizontally in the figure (FIG. 15A) and a pair of grooves vertically in the figure (FIG. 15B).

Withstand Voltage Test

While bending stress was applied to the obtained capacitors in the horizontal direction in the figure of FIGS. 15A and 15B, and a withstand voltage test was carried out as in Example 1. The capacitor shown in FIG. 15A with the grooves formed in the direction crossing the stress direction was superior in non-defective product percentage to the capacitor shown in FIG. 15B with the grooves formed in the direction parallel to the stress direction.

The capacitor according to the present invention is, because of its high reliability, used for various electronic devices in a preferred manner. The capacitor according to the present invention is mounted onto a board, and used as an electronic component. Alternatively, the capacitor according to the present invention is embedded in a board or an interposer, and used as an electronic component.

What is claimed is:

1. A capacitor comprising:
   a conductive porous base material, the conductive porous base material having at least one grove therein, the at least one groove having a width of 10 μm or more at ½ of a depth of the at least one groove;
   a dielectric layer on the conductive porous base material; and
   an electrode on the dielectric layer.

2. The capacitor according to claim 1, wherein the at least one groove is located between an end of the capacitor and an effective part of the capacitor, the effective part accumulating a charge in the dielectric layer when a voltage is applied between the conductive porous base material and the electrode.

3. The capacitor according to claim 1, wherein the capacitor includes a plurality of grooves.

4. The capacitor according to claim 3, wherein plurality of grooves intersect.

5. The capacitor according to claim 2, wherein the at least one groove surrounds the effective part.

6. The capacitor according to claim 5, wherein the at least one groove is continuous.

7. The capacitor according to claim 1, wherein the at least one groove is continuous.

8. The capacitor according to claim 3, wherein the plurality of grooves are intermittent.

9. The capacitor according to claim 8, wherein a distance between adjacent grooves of the plurality of grooves is 10 μm or less.

10. The capacitor according to claim 1, further comprising a resin or a metal filling the groove.

11. The capacitor according to claim 1, wherein the dielectric layer is formed by an atomic deposition layer.

12. The capacitor according to claim 1, wherein the electrode is an atomic deposition layer.

13. The capacitor according to claim 1, wherein the conductive porous base material includes a first porosity part and a second porosity part adjacent the first porosity part, the first porosity part having a higher porosity that the second porosity part, and the second porosity part having the at least one grove.

14. The capacitor according to claim 13, wherein the second porosity part surrounds the first porosity part.

15. The capacitor according to claim 14, wherein the at least one groove is located between an end of the capacitor and an effective part of the capacitor, the effective part accumulating a charge in the dielectric layer when a voltage is applied between the conductive porous base material and the electrode.

16. The capacitor according to claim 15, wherein the at least one groove surrounds the effective part.

17. The capacitor according to claim 16, wherein the at least one groove is continuous.

18. The capacitor according to claim 13, wherein the at least one groove is located between an end of the capacitor and an effective part of the capacitor, the effective part accumulating a charge in the dielectric layer when a voltage is applied between the conductive porous base material and the electrode.

19. The capacitor according to claim 18, wherein the at least one groove is continuous.

20. The capacitor according to claim 13, further comprising a resin or a metal filling the groove.

* * * * *